June 9, 1964 — F. W. RABE — 3,136,240
CROSS-FLOW AERATION SYSTEM FOR GRAIN BINS
Filed Nov. 28, 1960

INVENTOR
Frederick W. Rabe

BY Cecil L. Wood
ATTORNEY

3,136,240
CROSS-FLOW AERATION SYSTEM FOR GRAIN BINS
Frederick W. Rabe, 3111 Cornell Ave., Dallas 5, Tex.
Filed Nov. 28, 1960, Ser. No. 72,116
4 Claims. (Cl. 98—55)

This invention relates to apparatus and system for the treatment and handling of all types of grains, and its principal object resides in the provision of apparatus by which any of the cereal food grains, intended for human consumption, can be properly aerated and maintained in the highest standard of condition for the protection of the consuming public and the grain merchant, insuring a product capable of meeting the established quality standards; to prevent waste through spoilage, destructive insects, and other factors which encourage and facilitate the decomposition of all types of grain.

An important object of the invention is that of providing apparatus and a method by which through adequate aeration, great savings in natural resources can be accomplished by the reduction in losses of high quantities of grain through treatment of the commodities to produce as near perfect condition as possible surrounding the same, and in keeping with the particular characteristics thereof, to maintain its viability and germination qualities most ideal to the ultimate use to which such grain is to be allotted in commerce, i.e., whether the commodity is to be used for human consumption or for the preparation of animal feed.

It is also an object of the invention to provide apparatus or system of treating or handling grain to preserve and maintain its natural respiratory action which is brought about through atmospheric conditions, and to accomplish such action in a manner that will deter and abate damage by insects.

A still further object of the invention resides in the provision of apparatus by which cereal grains can be economically preserved in a near perfect condition in storage without the usual attendant expense and effort of periodically turning or rerunning the grain to aerate the same which operations generally require the provision of huge storage facilities and the added expense of handling mechanisms and labor, without the consideration of other factors, such as unfavorable weather conditions, and the like, which often adversely affect the grain to cause spoilage through heating, due to excess moisture, or checking, which occurs when the grain is uncommonly dry.

More particularly the invention is concerned with aerating the stored grain according to its density which obviously becomes greater at the lower levels of the bin thus appreciably increasing the force or power necessary to produce a vertical air flow therethrough. On the other hand, when a horizontal or cross flow is induced a greater rate of air flow can be maintained with a minimum of fan power.

The power required to move air through grain stored in high bins may become prohibitive, and for this reason, attention has been given to moving air through the grain horizontally when the diameter or width of the bin is less than its height, which is the conventional arrangement. Vertical and horizontal air flow, or cross flow, aeration systems necessarily involve different types of equipment. The former usually is the less expensive, and can function without special controls regardless of the grain level in the bin, but it has been found that substantially less power is required to induce a flow of air, at a given air flow rate, in a horizontal direction through a mass of grain contained in a vertical bin than is required to induce a flow of air through the mass in a vertical direction at the same air flow rate.

Assuming that the amount of power which is required to operate the fans whereby air is supplied to the system for aeration of the grain is constant, in the flow of air through the grain either horizontally or vertically the air flow rate increases inversely in proportion to the grain level in the bin. The rate of such increase is substantially greater for vertical air flow than for horizontal air flow.

An object of this invention is to provide a system for the aeration of grain stored in vertical bins which is characterized by its efficiency, as determined by the uniformity of distribution of air throughout a mass of grain contained in a bin and the amount of power required to provide a flow of air through the grain sufficient to aerate it.

Another object of the invention is to provide a system as described which includes the best features of both vertical and horizontal air flow through a mass of grain contained in a vertical bin, for aeration thereof, and in which portions of the mass positioned at progressively increasing depths are treated separately by contacting them with streams of air moving vertically and horizontally, respectively, at predetermined velocities sufficient to maintain substantially uniform rates of air flow (cubic feet per minute per bushel) throughout the mass.

Another object of the invention is to provide a system as described in which the direction of air flow through a mass of grain contained in a vertical bin, and the velocity of air flow therethrough, at progressively increasing depths are adjusted as necessary to maintain substantially uniform rates of air flow (cubic feet per minute per bushel) throughout the mass.

Another object of the invention is to provide a system as described which is characterized by its simplicity as well as its efficiency, and in which control is effected by a comparatively simple arrangement of air flow ducts whereby air is supplied to a bin having grain stored therein, and withdrawn therefrom, for the purpose of aerating the grain.

Another object of the invention is to provide a system as described which is applicable to existing grain elevators or bins, and which is adapted to be incorporated in such a bin without substantial alteration thereof.

The invention will be readily understood by referring to the following description and the accompanying drawing, in which.

Figure 1:
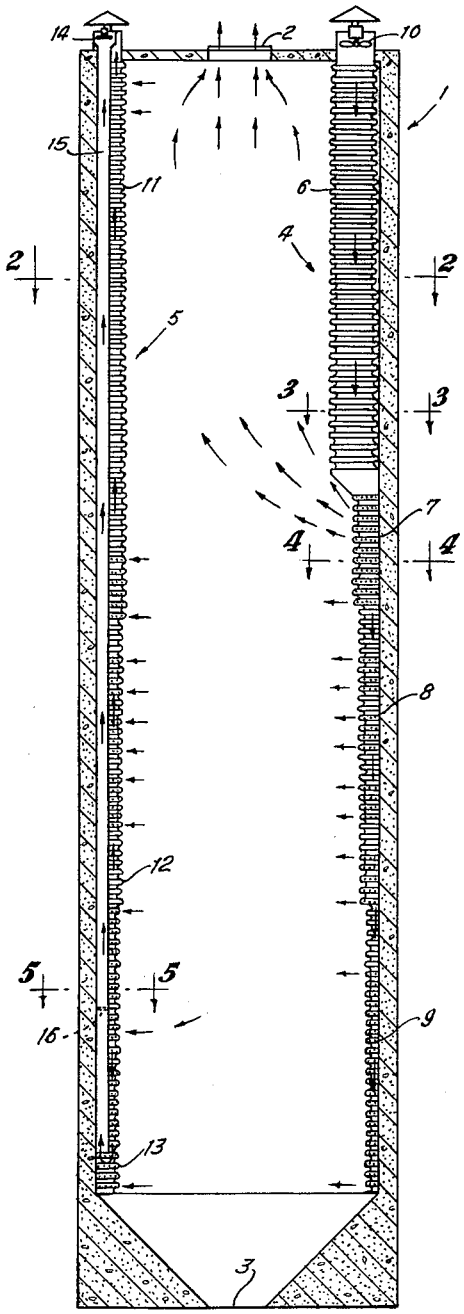
FIGURE 1 is a sectional elevational view, taken on a median line, of a grain elevator or bin having apparatus embodying the invention incorporated therein.
Figure 2:
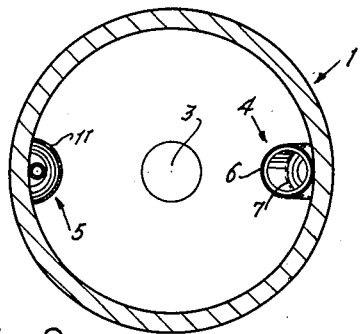
FIGURE 2 is a sectional plan view taken on the line 2—2 of FIGURE 1.
Figure 3:
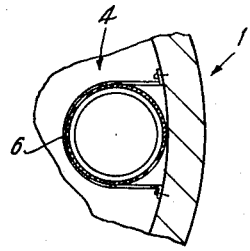
FIGURE 3 is a fragmentary sectional plan view, on an enlarged scale, taken on the line 3—3 of FIGURE 1.
Figure 4:
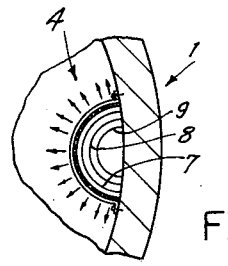
FIGURE 4 is a fragmentary enlarged view on line 4—4 of FIGURE 1.
Figure 5:
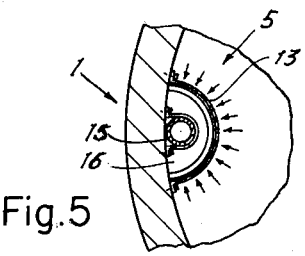
FIGURE 5 is a fragmentary sectional plan view, on an enlarged scale, taken on the line 5—5 of FIGURE 1.

Referring to the drawing, the numeral 1 designates generally a conventional grain storage elevator or bin which is illustrated as cylindrical, and is disposed vertically, and advantageously may be formed of concrete. The bin 1 is generally provided with a central opening or manhole 2 at the top, and a discharge opening 3 at the bottom thereof. The height of the bin 1 is several times greater than its diameter or width.

An air supply duct 4 and an air discharge duct 5, which are substantially coextensive with the height of the bin 1, are disposed vertically within the bin 1 adjacent opposite sides thereof. The air supply duct 4, which advantageously may be formed of corrugated sheet metal, includes an upper end section 6, first and second intermediate sections 7 and 8, and a lower end section 9. The sections 6, 7, 8, and 9 are positioned one above the other and are connected end to end to form a continuous air flow duct.

The upper end section 6 of the air supply duct 4, which is imperforate and preferably circular in transverse section, projects upwardly through the top of the bin 1 and extends downwardly below the top thereof a distance usually greater than the diameter or width of the bin. A fan 10 is operatively positioned in the upper end of the air supply duct 4, above the top of the bin 1, for forcing atmospheric air through the duct 4.

The first and second intermediate sections 7 and 8, and the lower end section 9 of the air supply duct 4 are semi-circular in transverse section, and have one side thereof formed by the inner wall of the bin 1. The diameters of the sections 7, 8, and 9 are progressively reduced, by sections, as they approach the bottom of the bin 1.

The first intermediate section 7 of the air supply duct 4 has circumferentially and longitudinally spaced perforations therein which are uniformly distributed over substantially its entire surface, facing the opposite side of the bin 1. The second intermediate section 8 and the lower end section 9, which are partially perforated, advantageously may have imperforate areas arranged between adjoining perforate areas, whereby the flow of air from the air supply duct 4 may be controlled.

The air discharge duct 5, which advantageously may be formed of corrugated sheet metal, includes an upper end section 11, an intermediate section 12, and a lower end section 13. The sections 11, 12, and 13 are positioned one above another and are connected end to end to form a continuous air flow duct.

The upper end section 11 of the air discharge duct 5 extends downwardly below the top of the bin 1 a distance which is substantially coextensive with the combined lengths of the upper end section 6 and the first intermediate section 7 of the air supply duct 4. The lower end portion of the section 11 of the air discharge duct has spaced perforate sections which occur substantially opposite the completely perforated section 7 of the air supply duct 4.

The sections 11, 12 and 13 of the air discharge duct 5, are semi-circular in transverse section, having one side thereof formed by the inner wall of the bin 1. The diameters of the sections 11, 12, and 13 are progressively reduced, by sections, as they approach the bottom of the bin 1.

The intermediate section 12 and the lower end section 13 of the air discharge duct 5, which are at least partially perforated, advantageously may have imperforate areas arranged between adjoining perforate areas, whereby the discharge of air through the air discharge duct 5 may be controlled.

The intermediate section 12 and the lower end section 13 of the air discharge duct 5 have lengths which are substantially coextensive with the lengths of the second intermediate section 8 and the lower end section 9 of the air supply duct 4, which are positioned diametrically opposite them, and have substantially the same cross sectional areas, respectively.

A suction fan 14 is arranged in the top of the bin 1 at the upper end of a vertically disposed pipe 15 arranged within the discharge duct 5. The pipe 15, which is open at its ends, extends from a point above the top of the bin 1 to a point near the lower end of the air discharge duct 5, the latter having a partition 16 in the lower end section 13 thereof, surrounding the pipe 15, whereby air entering the air discharge duct 5 below the partition 16 is directed upwardly through the pipe 15. The use of the pipe 15 and the fan 14, however, is optional, depending upon the relative length of the discharge duct 5.

While the invention has been described with great particularity, it is obvious that certain changes and modifications in structural details and application thereof may be resorted to, by persons skilled in the art, without departing from the spirit and intent of the invention or the scope of the appended claims.

What is claimed is:

1. In apparatus for aerating grain in storage in a bin having greater height than diameter, and adapted to induce horizontal air flow therethrough, an air flow conduit arranged vertically in one side of said bin and extending from the top to the bottom thereof, the upper portion, being of greater length than the diameter of said bin, having the greater diameter than successive lower portions thereof and being imperforate, an intermediate portion of said duct being perforate and having a diameter less than said upper portion, a smaller portion of said duct extending downwardly and having spaced perforated sections whereby to release air into the grain in said bin, the lowermost portion of said duct having the lesser diameter and having spaced perforate sections, a fan at the upper end of said air flow duct, a discharge duct arranged vertically of said bin opposite said air flow duct, perforate sections in the lower portions of said discharge duct, and a separate duct within said discharge duct to conduct air from the bottom of said bin to the top thereof.

2. In apparatus for aerating grain stored in bins of greater height than diameter, which comprises, an air flow duct arranged vertically along one side of a bin having perforate portions at different levels in said bin and sections of predetermined length and of progressively decreased diameter toward the bottom of said bin, a discharge duct arranged vertically in said bin opposite said air flow duct and having spaced perforate portions in its lower sections whereby air flows thereinto directly across from said air flow duct, a smaller duct within said discharge duct, and a fan adapted to force air through said air flow duct.

3. In apparatus as described in claim 2, in which a suction fan is arranged at the top of said discharge duct to force cross flow circulation of air through the grain mass in said bin.

4. Apparatus for aeration of grain comprising, in combination with a cylindrical, vertically disposed bin adapted to contain a quantity of grain, and having a central opening in the top thereof, the height of the bin being several times its diameter, an air supply duct and an air discharge duct, each substantially coextensive with the height of the bin and disposed vertically therein on opposite sides thereof, the air supply duct including an imperforate section beginning at its upper end and extending downwardly in said bin a distance greater than the diameter thereof, a perforate section immediately below the imperforate section, and a plurality of partially perforated sections below the perforated section, the cross sectional area of the sections below the imperforate section being reduced progressively, by sections, the air discharge duct including a first section, imperforate throughout a major portion of its length, beginning at its upper end and extending downwardly to a point opposite the lower end of the perforated section of the air supply duct, and having perforations in the lower portion thereof, the air discharge duct further including a plurality of partially perforated sections below the first section, the cross sectional area of the several sections being progressively reduced by sections, one of the ducts having a fan operatively positioned therein, an imperforate pipe open at its ends, arranged within said discharge duct and extending from the top thereof to a point near its lower end, and a partition in a section of said discharge duct below the first section, surrounding the pipe, whereby air entering the air discharge duct below the partition is directed upwardly through the pipe.

References Cited in the file of this patent

UNITED STATES PATENTS

| | | |
|---|---|---|
| 2,201,312 | Hauser | May 21, 1940 |
| 2,251,617 | Pirnie | Aug. 5, 1941 |
| 2,299,299 | Bills | Oct. 20, 1942 |
| 2,634,673 | Maho | Apr. 14, 1953 |
| 2,903,955 | Werner | Sept. 15, 1959 |

OTHER REFERENCES

| | | |
|---|---|---|
| 1,063,296 | France | Dec. 16, 1953 |